United States Patent [19]

Lo et al.

[11] 4,124,291
[45] Nov. 7, 1978

[54] CONTROL OF DEPTH OF FIELD IN THREE DIMENSIONAL PHOTOGRAPHY

[75] Inventors: Allen K. W. Lo; Jerry C. Nims, both of Dunwoody, Ga.

[73] Assignee: Dimensional Development Corp., Atlanta, Ga.

[21] Appl. No.: 747,354

[22] Filed: Dec. 3, 1976

[51] Int. Cl.$^2$ .................... G03C 9/00; G03B 35/14; G03B 27/32
[52] U.S. Cl. ........................................ 355/22; 96/40; 354/112
[58] Field of Search ............... 355/22; 352/57; 96/40; 350/130; 354/112, 114, 115, 195, 198

[56] References Cited

U.S. PATENT DOCUMENTS

| | | | |
|---|---|---|---|
| 725,567 | 4/1903 | Ives | 96/40 X |
| 2,063,985 | 12/1936 | Coffey | 354/115 |
| 2,527,106 | 10/1950 | Smith | 354/114 |
| 2,562,077 | 7/1951 | Winnek | 355/22 |
| 2,724,312 | 11/1955 | Gruetzner | 354/112 |
| 3,241,429 | 3/1966 | Rice et al. | 350/167 |
| 3,380,360 | 4/1968 | Stockbridge et al. | 354/112 |
| 3,503,316 | 3/1970 | Takano et al. | 354/112 |
| 3,521,947 | 7/1970 | Jones | 352/58 |
| 3,560,740 | 2/1971 | Tripp | 250/61 |
| 3,666,465 | 5/1972 | Winnek | 96/40 X |
| 3,678,833 | 7/1972 | Leach | 354/112 |
| 3,683,773 | 8/1972 | Dudley | 354/112 |
| 3,731,606 | 5/1973 | Geoffray | 350/130 X |
| 3,960,563 | 6/1976 | Lo et al. | 96/40 |

OTHER PUBLICATIONS

Leica Photography, vol. 13, No. 3, 1960, pp. 28 & 29, One Scale, Many Uses.
Leica Photograph, vol. 14, No. 4, 1961, pp. 14 & 15.
Leica School Notebook Facts About Depth of Field.
Applied Optics, vol. 10, No. 10, 10/1971 Optimum Design and Depth Resolution of Lens-Sheet and Projection-Type Three-Dimensional Displays, T. Okoshi pp. 2284-2291.

*Primary Examiner*—Donald A. Griffin
*Attorney, Agent, or Firm*—Brumbaugh, Graves, Donohue & Raymond

[57] ABSTRACT

In a camera for taking stereoscopic photographs, wherein a lenticular screen and photosensitive film are exposed to an object field through a wide effective aperture, the effective aperture size is controlled so that the image of a point on each of the nearest foreground object and the farthest background object in the object field is confined within a region of the lenticular screen which is not greater than 20 lenticules, and preferably not greater than 10 lenticules, in width.

7 Claims, 6 Drawing Figures

CONTROL OF DEPTH OF FIELD IN THREE DIMENSIONAL PHOTOGRAPHY

BACKGROUND OF THE INVENTION

The present invention relates to a method for producing stereoscopic photographs, and particularly to a method wherein a stereoscopic photograph is produced by exposing a lenticular screen and photosensitive film to an object field through a wide effective aperture.

A well known method for producing stereoscopic or three dimensional photographs is described in U.S. Pat. No. 3,503,316 to Takano et al. In accordance with the known technique, a camera is provided with a photosensitive film and a cylindrical lenticular screen adjacent to the film. The lenticular screen is shifted in position by one lenticule as the film is exposed to an object field through a variety of aspect angles. The variation in exposure to the object field is usually produced by the use of a narrow aperture which is moved with respect to the object field in a direction which is transverse to the optical axis of the camera lens and transverse to the lenticules of the lenticular screen. The moving narrow aperture may be achieved by movement of the camera as indicated in the Takano specification, or may be effected by moving of a narrow aperture slot across a wide aperture lens as shown in U.S. Pat. No. 3,521,947 to Jones. In either case, in accordance with the understanding of the prior art, it was considered necessary that the effective aperture, that is, the total distance through which the aperture is moved during the exposure of the film, had to equal and preferably exceed the human interocular distance of approximately 65 mm.

Another technique for producing stereoscopic photographs makes use of a camera with a large diameter lens of the type described in U.S. Pat. No. 2,562,077 to Winnek. In a camera of this type, the film is fixed with respect to the lenticular screen and is simultaneously exposed to the object field from a variety of angles through the large diameter lens. As shown in U.S. Pat. No. 3,683,773 to Dudley, this type of camera may use a spherical lenticular screen as well as the more customary cylindrical screen. In accordance with the understanding of the prior art, such large diameter lens cameras also were provided with effective apertures which equaled or exceeded the human interocular distance of 65 mm.

Heretofore, however, such prior art wide aperture techniques have been found to produce unsatisfactory results. Poor image quality results from the foregoing techniques because the images of objects which are nearer to or further from the camera than the focused distance tend to be defocused on the image plane and consequently spread out over a large area. This spreading of the image is directly proportional to the size of the effective aperture of the camera, that is, the large aperture size or the distance over which a small aperture opening is moved during the exposure process. When excessive image spreading takes place in the camera, as frequently occurs where the effective aperture is 65 mm or greater, the images of objects in the stereoscopic photograph may appear blurred or faded to the extent that images of some objects appear to lack solidity.

The method of the present invention overcomes these and other limitations of prior art stereoscopic photographic techniques.

SUMMARY OF THE INVENTION

In accordance with the invention, there is provided a method for taking a stereoscopic photograph of an object field with a camera having a wide effective aperture, including a focusing lens, and wherein a photosensitive surface located behind a lenticular screen is exposed to the object field through the effective aperture. The object field includes a key subject matter object on which the focusing lens is focused and one or both of a nearest foreground object located closer to the camera than the key subject matter object and a farthest background object located farther from the camera than the key subject matter object. The improvement of the method comprises controlling one or more of (1) the distance from the focusing lens to the nearest foreground object, (2) the distance from the focusing lens to the farthest background object, (3) the distance from the focusing lens to the key subject matter object, and (4) the size of the effective aperture, such that the size in the direction of the lenticular width of the image circle formed on the photosensitive film of each of the nearest foreground object and the farthest background object does not exceed 20 lenticular widths and preferably does not exceed 10 lenticular widths. Although one or all of the foregoing variables may be adjusted to provide the desired control of the image circle size, only the effective aperture size need be adjusted in most situations. This enables the photographer to photograph diverse subject matters without having to rearrange the scene. When the lenticular screen is formed with cylindrical lenticules, the effective aperture size need only be adjusted for this purpose in the direction transverse to the length of the lenticules. When the lenticular screen has spherical lenticules, the effective aperture size must be adjusted in both transverse directions.

The method of the invention may be used with cameras of the type having a large diameter focusing lens by providing an adjustable opening diaphragm for control of the effective aperture size of the lens or by using a narrow shutter slot which scans across the focusing lens to the extent of the desired effective aperture size. Alternatively, the desired effective aperture size may be provided with a camera having a small diameter focusing lens by scanning the camera through a distance equal to the desired size of the effective aperture.

BRIEF DESCRIPTION OF THE DRAWINGS

For a better understanding of the invention, reference may be made to the following detailed description, taken in conjunction with the accompanying drawings, in which:

FIGS. 1A and 1B are detailed views of the lenticular screen and print film of the camera of FIG. 1;

DESCRIPTION OF EXEMPLARY EMBODIMENTS OF THE INVENTION

Figure 1:
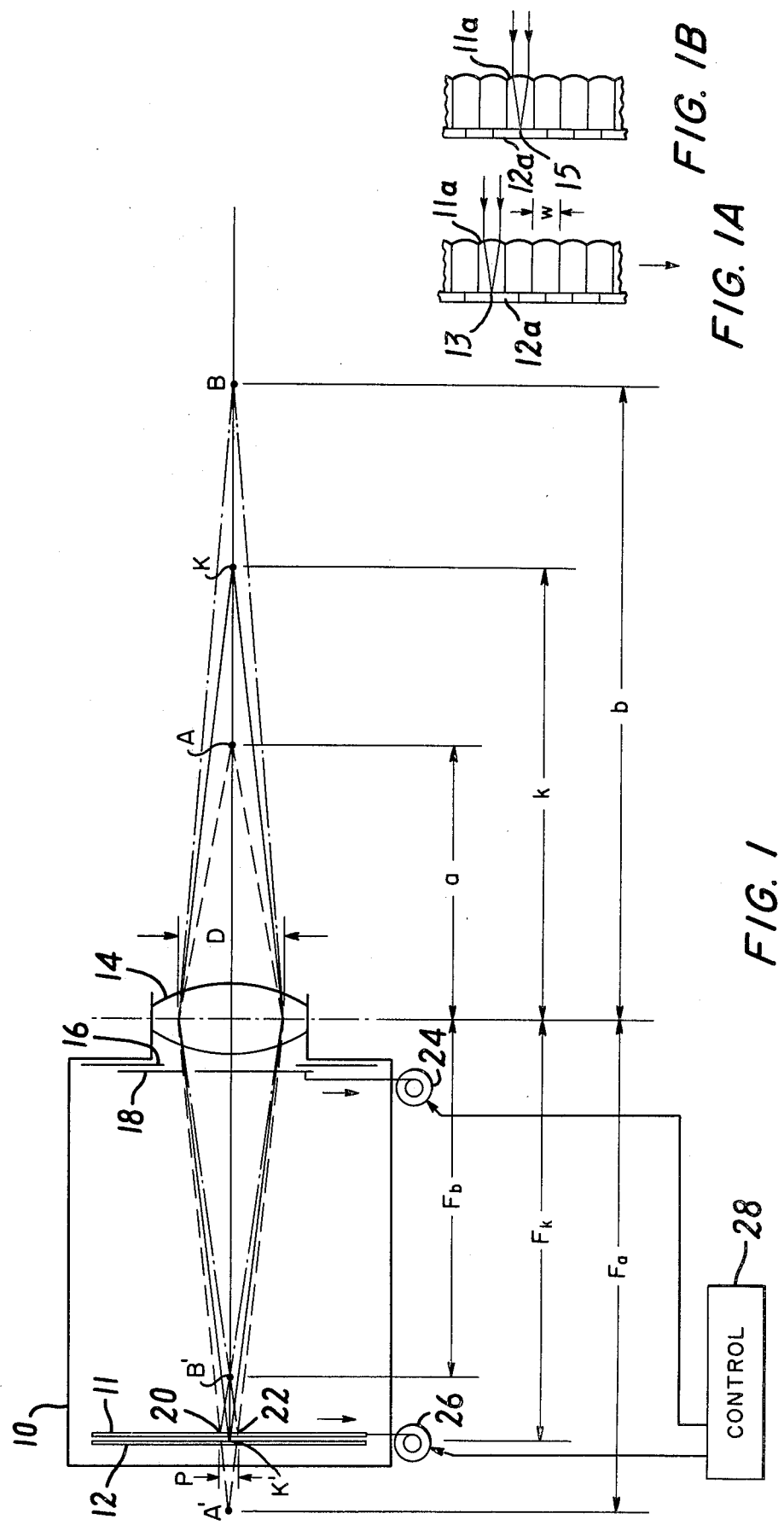
FIG. 1 illustrates the use in accordance with the invention of a camera having a large diameter focusing lens and scanning shutter.

FIG. 1 is a schematic top view of a wide-aperture camera which is useful for practicing the present invention. A lenticular screen 11, having a photosensitive film 12 adjacent the rear surface thereof, is positioned opposite a large-diameter focusing lens 14. Although referred to herein as a large-diameter lens, it will be appreciated from the ensuing description that the lens 14 need not be 65 mm or more in diameter, though it could be. In the region of the lens, there is provided an adjustable diaphragm 16 for regulating the width D of the aperture. Behind diaphragm 16 there is provided a shutter 18 having a narrow-opening 19 which traverses the aperture to expose film 12 from a variety of angles with respect to the object field. The lenticules of lenticular screen 11, shown in more detail in FIGS. 1A and 1B are cylindrical. The lenticules suitably run in the vertical direction, as is known in the art. The width of an individual lenticule is indicated in FIG. 1A by the letter $w$.

FIG. 1 also depicts a representative field or photographic sense, in which there are located three objects labeled K, A, and B. For convenience, the objects, K, A, and B are designated by points located on the optical axis of lens 14. These points are selected to simplify the explanation of the operation of the camera and the geometrical relationships involved. It should be understood that the principles of the invention apply with equal force to objects located off the optical axis. Object K is the object on which lens 14 is focused and, since the camera is usually focused on the most important, or key, object in the scene to be photographed, is referred to herein as the key subject matter. It will be understood, therefore, that the image of the key subject matter object K will appear to be in the plane of the stereoscopic picture, while the image of object A, located closer to the camera than object K, will appear in the foreground of the stereoscopic picture and the image of object B, located further from the camera than object K, will appear in the background of the stereoscopic picture.

As is described more fully hereinafter, the actual width of the effective aperture of the camera is controlled by adjustment of diaphragm 16 or adjustment of the traverse of opening 19 in shutter 18, in accordance with the arrangement of the object field and in accordance with the lenticule width $w$ of lenticular screen 11. Any suitable mechanism may be employed for adjustment of the diaphragm such as are disclosed, for example, in U.S. Pat. No. 2,063,985 and U.S. Pat. No. 2,562,077. The pertinent portions of those patents are hereby incorporated into the present application. Likewise, the traverse of shutter 18 may be regulated by techniques known to those skilled in the art.

In accordance with the photographic technique to which the present invention applies, it is necessary to synchronize the scanning of shutter 18 with motion of lenticular screen 11. Screen 11 is moved with respect to film 12 by a distance corresponding to one lenticule width $w$ during shutter scanning. This motion results in complete exposure of the area 12a of photosensitive film 12 behind each lenticule 11a as illustrated in FIGS. 1A and 1B. FIG. 1A illustrates the position of screen 11 and film 12 at the start of the shutter scanning, incident light is focused by lenticule 11a on a strip 13 along one edge of area 12a. At the end of the shutter scan, as illustrated in FIG. 1B, the light is focused at the opposite edge 15 of area 12a.

Movement of shutter 18 and screen 11 is synchronized by control unit 28. As more fully discussed below, in accordance with the invention, the shutter traverse may be increased or decreased to control the effective apparatus. It therefore becomes necessary to vary the velocity of shutter 18 or screen 11 to assure shutter traverse of the effective aperture size D during the same time interval that screen 11 moves by lenticule width $w$, since the relation between D and $w$ is variable in accordance with the invention for different object field arrangements. One arrangement for achieving this shutter or screen velocity variation is to use stepping motors 24 and 26 to move shutter 18 and screen 11 respectively. Controls 28 may then be designed to provide different variable frequency pulse signals to motors 24 and 26 in accordance with the required value of D, $w$ and exposure time. U.S. Pat. No. 3,521,947 discloses another technique for controlling the shutter traverse and speed and for synchronizing shutter scanning with relative movement between screen 11 and film 12.

It is well known in the photographic art that a wide effective apparatus will cause a rather large amount of parallax in the focused image, with the result that the images of objects nearer to or farther from the camera than the focused distance may tend to be overly expanded across the film plane. As illustrated by the solid lines in FIG. 1, object K which is located at the focused distance $k$ from the camera, is sharply focused at point K' in the image on lenticular screen 11 and photosensitive film 12 for all angles of exposure of the object field. Object B, on the other hand, is focused on a plane containing a point B' (see the dash-dot lines) which is at a distance $F_b$ behind lens 14 somewhat shorter than the focal distance $F_k$. As a result, some of the light emanating from point B will fall on point K' by travelling along the optical axis of lens 14, while the remainder of the light will be spread out across the lenticular screen between points 20 and 22 during the shutter traverse. Similarly, light from object A, located at a distance $a$ from lens 14, will be focused on a plane containing a point A' spaced at a distance $F_a$ behind the lens. It will also be spread between points 20 and 22 during the shutter traverse. For purposes of illustrating the present invention, the distances $a$ and $b$ to objects A and B, respectively, have been selected so as to cause an equal amount of defocusing on lenticular screen 11. The width of the region of defocusing, indicated by the letter P in FIG. 1, is a measure of the amount of parallax between the image K' of the key object K and the images A' and B' of the foreground object A and the background object B, respectively. In accordance with the invention, the size of the region P, i.e., the size of the image circle of object a or the size of the image circle of object B, is maintained within a maximum permissible value, and preferably within an optimum value. Those skilled in the art will recognize that for non-circular effective aperture, as exist in the embodiment of FIG. 1, the "image circles" of objects A and B will be correspondingly non-circular.

The illusion of depth in a stereoscopic picture produced with the camera of FIG. 1 results from the fact that light emanating at different angles from each object not at the focused distance, such as objects A and B for example, is caused to be incident on different lenticules of lenticular screen 11 over the region P during the scanning of shutter 18. Consequently, image strips are formed behind the lenticules located within the region P which depict different angular views of such objects. When viewing the final photograph again through a lenticular screen, each eye of an observer sees a different one of such different angular views, and the observer therefore perceives the overall image in dimension.

As previously mentioned, the prior art teaches that the width D of the effective aperture opening should be at least equal to, and preferably greater than, the normal interocular distance of 65 mm. This selection is based on the false assumption that an acceptable stereoscopic image will not be produced if D is less than 65 mm. From the foregoing description, it will be realized that the parallax effect on the stereoscopic picture, i.e., the size of P, will be increased as the width D of the aperture is increased. It has been found, however, that excess parallax, resulting from use of too large an effective aperture, results in fading of the image density of objects not located at the focused distance of the camera and consequently may render the images of the objects less solid in appearance. This degrades the quality of the stereoscopic picture by causing interference between images of different objects and also by giving the image a washed-out look. In addition, an excess amount of parallax may cause the object images to be out of focus and blurred, thereby further detracting from the appearance of the stereoscopic photograph.

Through experimentation with three dimensional cameras of the type illustrated, it has been discovered that image quality, in terms of image density and image sharpness, may be improved by limiting the amount of parallax resulting from the wide aperture to an amount such that the size P of the image circle for each of the nearest foreground object A and the farthest background object B does not exceed 20 $w$, where $w$ is the width of an individual lenticule of the lenticular screen 11. It has further been found that for optimum image density and clarity the value of P should not exceed 10 $w$. Such control of the image circle size may be accomplished by appropriate selection of the distances $a$, $k$, and $b$ and/or by adjustment of the aperture size D.

In use in accordance with the invention, the camera of FIG. 1 is first focused on the key subject matter object K. The aperture width D of the camera is then adjusted to provide the correct amount of parallax, i.e., and image circle P within permissible limits for the particular object field in front of the camera. In the illustration of FIG. 1, object A is that object in the object field which is located closest to the camera and object B is that object spaced farthest from the camera. Although not shown, intermediately spaced foreground or background objects may also be included. It will be appreciated, however, that it is the nearest and farthest spaced objects which govern image circle size P. The aperture size D is adjusted such that neither the image circle for object A nor the image circle for object B exceeds the maximum permissible value of P (20 $w$) and preferably such that neither circle exceeds the optimum value of P (10 $w$).

The proper setting of the aperture opening D for particular values of $a$ and $b$ may be determined from the following equations, which are evident from the geometrical relationships of FIG. 1:

$$D = \frac{F_a P}{F_a - F_k} \quad (1)$$

$$D = \frac{F_b P}{F_k - F_b} \quad (2)$$

As will be apparent, Eq. (1) may be used to determine D where the foreground distance $a$ and the focused distance $k$ are known, while Eq. (2) may be used where the background distance $b$ and the focused distance are known.

Normal optical equations can be used to determine the focal distances $F_a$, $F_b$, and $F_k$ as follows:

$$F_k = \frac{kF}{k - F} \quad (3)$$

$$F_a = \frac{aF}{a - F} \quad (4)$$

$$F_b = \frac{bF}{b - F} \quad (5)$$

where F is the effective focal length of lens 14. In this respect, it will be understood that lens 14 may comprise a composite lens system rather than the simple lens shown in FIG. 1.

By combining Eqs. (1)–(5), the following expressions relating the aperture size D directly to the focused distance $k$, the focal length F, and the foreground and background distances $a$ and $b$, respectively, may be derived:

$$D = \left[ \frac{a(k - F)}{F(k - a)} \right] P \quad (6)$$

$$D = \left[ \frac{b(k - F)}{F(b - k)} \right] P \quad (7)$$

The actual value of D to be used in producing the stereoscopic photograph is the smaller of the two values determined using Eqs. (6) and (7).

An example of the determination of D for a typical photographic situation is as follows:
F = 400mm
$a$ = 600mm
$k$ = 1000mm
$b$ = 3000mm
$w$ = 0.4mm
P max = 8mm (20 × 0.4mm/lenticule)

Using these values, Eqs. (6) and (7) both yield a solution for D of 18mm, which is the value which would be used for the aperture opening D to photograph the object field enclosed by the given foreground, background and focused distances $a$, $b$, and $k$, respectively. Thus with the camera focused at 1000mm and the aperture opening set at 18mm, all objects at or within the near limit $a$ of 600mm and the far limit $b$ of 3000mm would appear solid and sharply focused in the stereoscopic photograph. It is immediately apparent that this aperture opening is considerably less than that used in the prior art, namely 65mm or greater.

The required effective aperture opening D in accordance with the invention may be computed for the particular object field, and the camera opening set in accordance with the computation. In order to provide more convenient implementation of the adjustment of the camera aperture, the camera may include three rangefinders. The first rangefinder could be keyed to adjustment of the focal distance $F_k$ and would be used to focus the camera on the key subject matter object K. The second and third rangefinders would be arranged to adjust the aperture diaphragm 16 in accordance with the distances a and b to the nearest and furthest objects in the object field. A camming arrangement may be used to adjust diaphragm 16 to the lowest required value of D in accordance with distances a, b, and k. Alternatively, dual diaphragms may be used, the effective aperture being determined by the smaller diaphragm opening. Also, the adjustable diaphragm mechanisms of U.S. Pat. Nos. 2,063,985 and 2,562,077 may be employed.

Those skilled in the art will recognize that in the embodiment of FIG. 1 aperture opening D extends horizontally across the lenticules of lenticular screen 11. This is the only dimension of the aperture which need be controlled to achieve the desired parallax effect when a cylindrical lenticular screen is used and the lenticules run vertically. The vertical opening of the aperture would be controlled to obtain the correct depth of field in accordance with standard two-dimension photographic techniques. Typically, the vertical aperture opening would be less than the horizontal effective aperture width D required for parallax control purposes.

Figure 2:
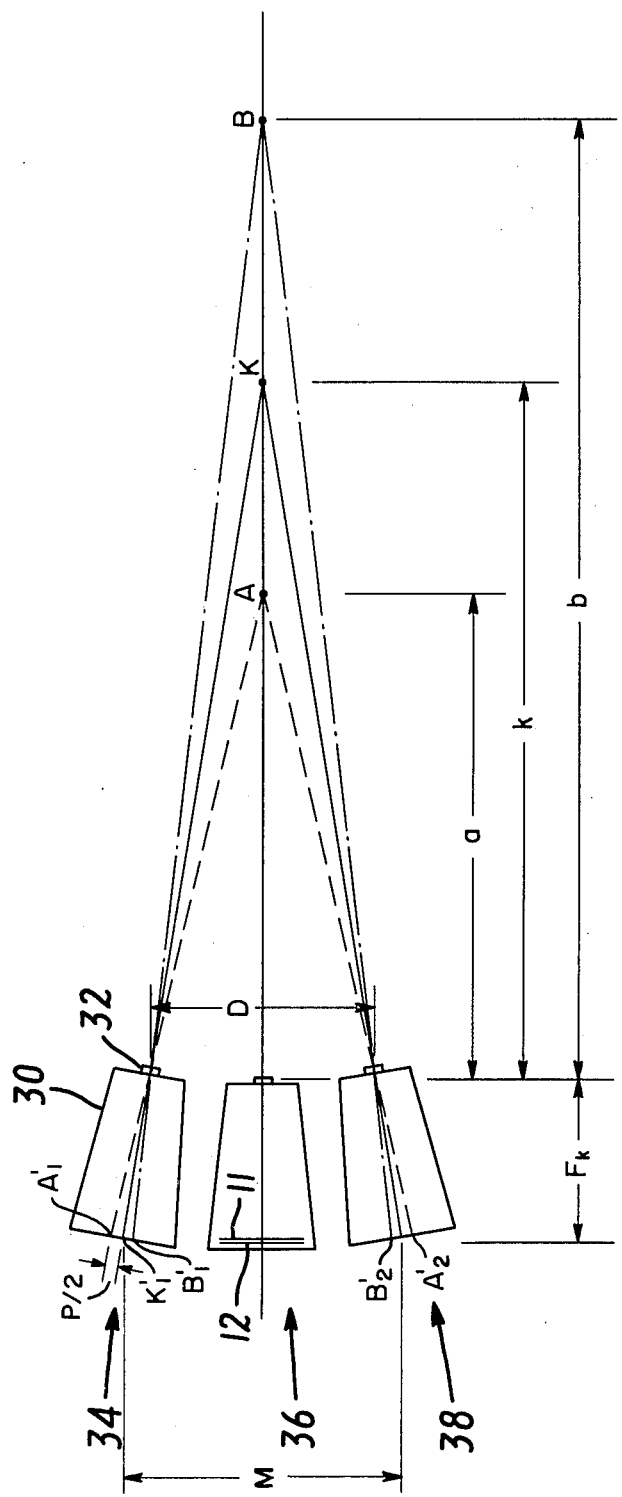
FIG. 2 illustrates the use in accordance with the invention of a camera having a small-diameter focusing lens.
Figures 3, 3A:
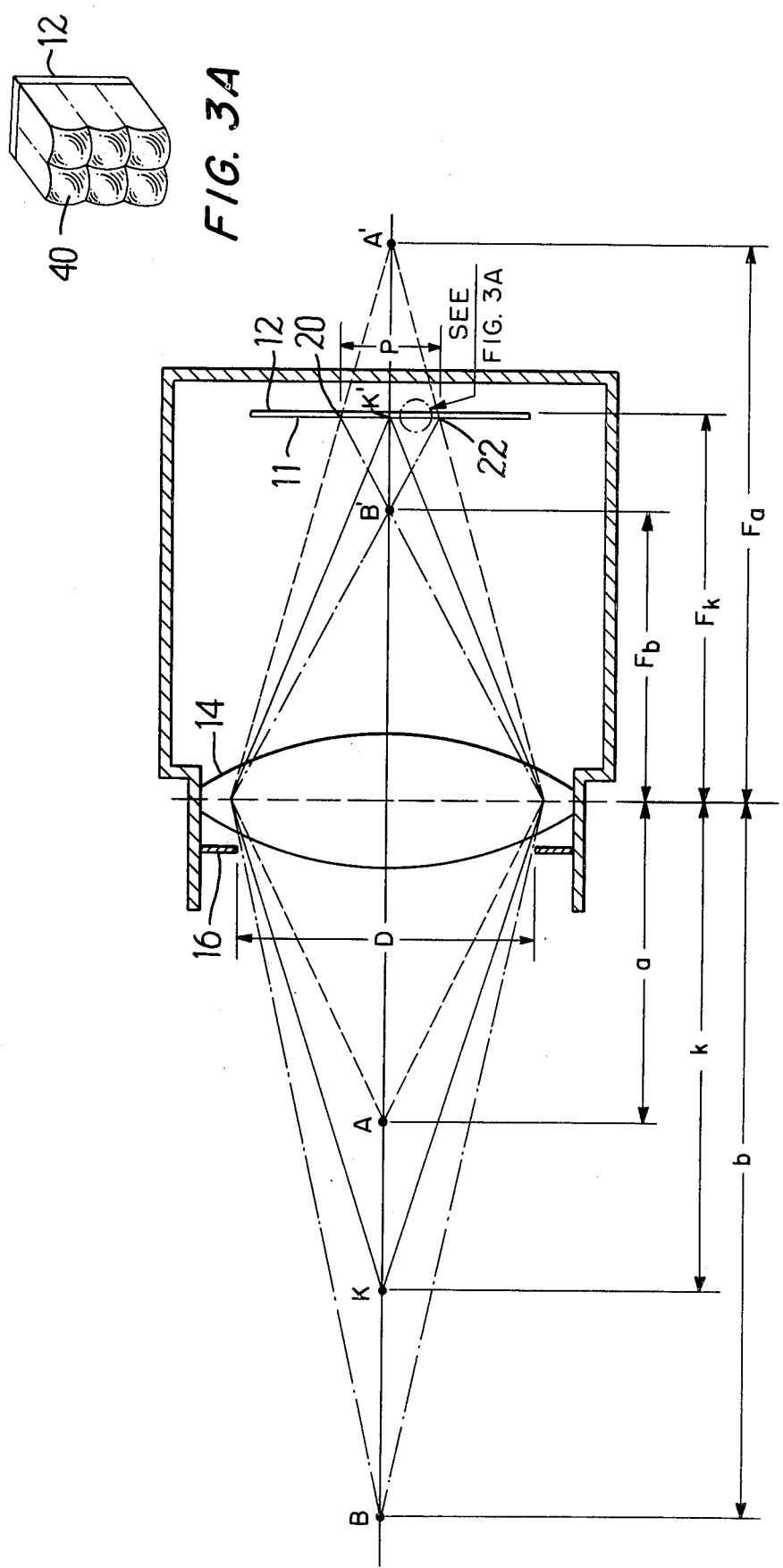
FIG. 3 illustrates the use in accordance with the invention of another camera having a large diameter focusing lens.
FIG. 3A is a detailed view of the lenticular screen and print film of the camera of FIG. 3.

FIG. 2 illustrates the application of the invention to a scanning three-dimensional camera of the general type described in U.S. Pat. No. 3,503,316, the operation of which is illustrated in FIG. 3 of that patent. The pertinent portions of U.S. Pat. No. 3,503,316 are hereby incorporated into the present application.

In the scanning three-dimensional camera 30 illustrated in FIG. 2, there is provided a small diameter focusing lens 32, lenticular screen 11 and film 12. The camera is moved along an arc centered at the key subject matter during exposure in the sequence of positions 34, 36, and 38. During scanning of camera 30, lenticular screen 11 is shifted by one lenticule with respect to film 12. The length of travel of lens 32 is indicated by the dimension D in FIG. 2, and the corresponding movement of the lenticular screen and print film is indicated by the dimension M. These movements are coordinated so that the image of the object K on which the lens 32 is focused falls at a point K' on the lenticular screen film which does not change as the camera 30 is moved.

As is evident from the FIG. 2, the images of objects located nearer to or farther from lens 32 than the focused object K, e.g., objects A and B, are changed in position on the lenticular screen and film as the lens 32 moves through the distance D, whereby such images, e.g., images A' and B', are incident on different lenticules of the lenticular screen. For example, the total movement of the image A' of the nearest foreground object A corresponding to movement of the lens 32 through the distance D shifts from the point A'$_1$, on one side of image K' (camera at position 34) to a point A'$_1$ on the other side of image K' (camera at position 38). The image B' of background object B likewise shifts from point B'$_1$ to point B'$_2$. In the embodiment of FIG. 2, the effective aperture of the camera corresponds to the distance D through which lens 32 is scanned during exposure of the photosensitive film. According to the invention, the scanning distance is controlled such that the total movement (size of image circle) of the image of any object in the object field does not exceed a distance corresponding to 20 w and preferably a distance of no more than 10 w.

Using the geometrical relationships of FIG. 2, the following equations will be evident:

$$D = \frac{a(M+P)}{(F_k + a)} \quad (8)$$

$$D = \frac{b(M-P)}{(F_k + b)} \quad (9)$$

The amount of movement M of the lenticular screen and film is determined in accordance with the following relationship:

$$M = \frac{D}{K}(F_k + k) \quad (10)$$

Combining these equations and Eq. (3), it may be shown that the limits to the effective aperture D of the embodiment of FIG. 2 are determined in accordance with Eqs. (6) and (7) are set forth above. There is therefore an exact correspondence between the correct amount of lens travel to create the effective aperture D in the embodiment of FIG. 2 and the diaphragm opening D to be used in the embodiment of FIG. 1. It will be appreciated, therefore, that the total distance along the surface of the lenticular screen 11 between A'$_1$ and A'$_2$, or between B'$_1$ and B'$_2$, should not exceed 20 w and preferably does not exceed 10 w. The maximum permissible distance by which point A'$_1$ or A'$_2$ (or B'$_1$, or B'$_2$) may be spaced from the image K' at either end of the travel D of lens 32 is thus P/2.

FIG. 3 is a top view of a three dimensional camera wherein the lenticular screen 11 and film 12 are simultaneously exposed to the object field through a large effective aperture. In this type of camera the screen and film are in a fixed relation and need not be shifted during exposure. It will be evident from close inspection of FIG. 3 that the objects and images are in the identical relation as those of the FIG. 1 camera, consequently the same equations for control of aperture size D apply. The lenticular screen 11 may be of the cylindrical type shown in FIG. 1A, in which case only the aperture size in the direction transverse to the lenticules is controlled in accordance with the invention.

The simultaneous exposure camera of FIG. 3 may also be used with a lenticular screen 40 shown in FIG. 3A, which has spherical lenticules of the type described in U.S. Pat. No. 3,683,773. In this event the aperture size D must be controlled in both planes transverse to the optical axis in accordance with the invention.

It will be understood by those skilled in the art that the above-described embodiments are illustrative only, in that they are susceptible of modification and variation without departing from the inventive concepts disclosed herein. For example, the distance through which the shutter 18 in FIG. 1 or the camera lens 32 in FIG. 2 traverses may be maintained constant, and the size D of the effective aperture may be varied by exposing the photosensitive film 12 over only a portion of the travel of the shutter or the lens. Also, while the objects A, B, and K have been described as separate entities, it will be understood that two or all of them may comprise parts of a single large object. All such variations and modifications, therefore, are intended to be included within the spirit and scope of the appended claims.

We claim:

1. In a method for taking a stereoscopic photograph of an object field with a camera of the type having a large effective aperture including a focusing lens and wherein a photosensitive surface located behind a lenticular screen is exposed to the object field through said aperture, the object field including a key subject matter object on which the focusing lens is focused and one or both of a nearest foreground object located closer to the camera than the key subject matter object and a farthest background object located farther from the camera than the key subject matter object, the improvement comprising:

controlling one or more (1) the distance $a$ from the focusing lens to the nearest foreground object, (2) the distance $b$ from the focusing lens to the farthest background object, (3) the distance $k$ from the focusing lens to the key subject matter object, (4) the focal length F of the lens and (5) the size D of the effective aperture in the direction of lenticule width, such that D is smaller than either:

$$\left[\frac{a(k-F)}{F(k-a)}\right]20w$$

or $$\left[\frac{b(k-F)}{F(b-k)}\right]20w$$

where $w$ is the width in said direction of an individual lenticule.

2. The method of claim 1 wherein said focusing lens comprises a large diameter lens and wherein the effective aperture size D is controlled by varying the opening size of an adjustable diaphragm associated with said lens.

3. The method of claim 1 wherein said focusing lens comprises a large diameter lens and wherein the effective aperture size D is controlled by adjusting the length of travel thereacross of a narrow shutter slot.

4. The method of claim 1 wherein said focusing lens comprises a small diameter lens and wherein said effective aperture size D is controlled by adjusting the length of travel of said lens relative to the object field.

5. The method of claim 1 wherein the lenticules of said lenticular screen are cylindrical and wherein the size D of the effective aperture is controlled, according to the improvement, only in said direction of lenticule width, which is the direction transverse to the length of the lenticules.

6. The method of claim 1 wherein the lenticules of said lenticular screen are spherical and wherein the size D of the effective aperture is controlled, for purposes of limiting said image circle size, in both transverse directions.

7. The method according to claim 1 wherein D is smaller than either:

$$\left[\frac{a(k-F)}{F(k-a)}\right]10w$$

or $$\left[\frac{b(k-F)}{F(b-k)}\right]10w.$$

* * * * *

UNITED STATES PATENT OFFICE
CERTIFICATE OF CORRECTION

Patent No. 4,124,291     Dated November 7, 1978

Inventor(s) Allen K. W. Lo and Jerry C. Nims

It is certified that error appears in the above-identified patent and that said Letters Patent are hereby corrected as shown below:

Col. 3, line 24, "sense" should read --scene--;
Col. 4, line 7, "apparatus" should read --aperture--;
Col. 4, line 16, "Controls" should read --Control--;
Col. 4, line 24, "apparatus" should read --aperture--;
Col. 4, line 55, "object a" should read --object A--;
Col. 5, line 35, "farthes" should read --farthest--;
Col. 5, line 47, "and" should read --an--;
Col. 7, line 57, "$A'_1$" should read --$A'_2$--;
Col. 8, line 20, delete "are"; and
Col. 9, line 11, after "more" insert --of--.

Signed and Sealed this

Seventh Day of August 1979

[SEAL]

Attest:

LUTRELLE F. PARKER

Attesting Officer     Acting Commissioner of Patents and Trademarks